US007358305B2

(12) United States Patent
Rajagopalan (10) Patent No.: US 7,358,305 B2
(45) Date of Patent: Apr. 15, 2008

(54) GOLF BALLS CONTAINING IMPACT MODIFIED NON-IONIC THERMOPLASTIC POLYCARBONATE/POLYESTER COPOLYMERS OR BLENDS

(75) Inventor: Murali Rajagopalan, South Dartmouth, MA (US)

(73) Assignee: Acushnet Company, Fairhaven, MA (US)

(*) Notice: Subject to any disclaimer, the term of this patent is extended or adjusted under 35 U.S.C. 154(b) by 494 days.

(21) Appl. No.: 11/032,267

(22) Filed: Jan. 10, 2005

(65) Prior Publication Data

US 2005/0154138 A1  Jul. 14, 2005

Related U.S. Application Data

(63) Continuation-in-part of application No. 10/617,646, filed on Jul. 11, 2003, now Pat. No. 6,926,620, which is a continuation of application No. 10/008,013, filed on Nov. 13, 2001, now Pat. No. 6,616,549, which is a continuation-in-part of application No. 09/161,223, filed on Sep. 28, 1998, now Pat. No. 6,315,680, which is a continuation-in-part of application No. 08/996,718, filed on Dec. 23, 1997, now Pat. No. 6,124,389, and a continuation-in-part of application No. 08/706,008, filed on Aug. 30, 1996, now Pat. No. 5,813,923, and a continuation-in-part of application No. 08/603,057, filed on Feb. 16, 1996, now Pat. No. 5,759,676, and a continuation-in-part of application No. 08/606,373, filed on Feb. 23, 1996, now Pat. No. 5,721,304, and a continuation-in-part of application No. 08/746,362, filed on Nov. 8, 1996, now Pat. No. 5,810,678, said application No. 08/996,718 is a continuation-in-part of application No. 08/482,522, filed on Jun. 7, 1995, now Pat. No. 5,688,191, said application No. 08/706,008 is a continuation-in-part of application No. 08/482,522, filed on Jun. 7, 1995, now Pat. No. 5,688,191, said application No. 08/603,057 is a continuation-in-part of application No. 08/482,522, filed on Jun. 7, 1995, now Pat. No. 5,688,191, said application No. 08/606,373 is a continuation-in-part of application No. 08/482,522, filed on Jun. 7, 1995, now Pat. No. 5,688,191, said application No. 08/746,362 is a continuation-in-part of application No. 08/482,522, filed on Jun. 7, 1995, now Pat. No. 5,688,191.

(51) Int. Cl.
A63B 37/00 (2006.01)
A63B 37/12 (2006.01)
C08L 69/00 (2006.01)

(52) U.S. Cl. .................. 525/67; 525/92 E; 525/439; 473/374

(58) Field of Classification Search .................. None
See application file for complete search history.

(56) References Cited

U.S. PATENT DOCUMENTS

| 3,262,272 | A | 7/1966 | Barakauskas et al. |
| 4,359,379 | A | 11/1982 | Ushio et al. |
| 4,467,057 | A | 8/1984 | Dieck et al. |
| 4,879,346 | A | 11/1989 | Bopp et al. |
| 5,006,297 | A | 4/1991 | Brown et al. |
| 5,455,302 | A | 10/1995 | Saito et al. |
| 5,455,310 | A | 10/1995 | Hoover et al. |
| 5,530,083 | A | 6/1996 | Phelps et al. |
| 5,605,980 | A | 2/1997 | Boutni et al. |
| 5,608,026 | A | 3/1997 | Hoover et al. |
| 5,688,191 | A | 11/1997 | Cavallaro et al. |
| 5,721,304 | A | 2/1998 | Pasqua, Jr. |
| 5,733,428 | A | 3/1998 | Calabria et al. |
| 5,759,676 | A | 6/1998 | Cavallaro et al. |
| 5,810,678 | A | 9/1998 | Cavallaro et al. |
| 5,813,923 | A | 9/1998 | Cavallaro et al. |
| 5,932,677 | A | 8/1999 | Hoover et al. |
| 6,072,011 | A | 6/2000 | Hoover |
| 6,124,389 | A | 9/2000 | Cavallaro et al. |
| 6,150,462 | A | 11/2000 | Rajagopalan et al. |
| 6,162,135 | A | 12/2000 | Bulpett et al. |
| 6,291,592 | B1 | 9/2001 | Bulpett et al. |
| 6,417,278 | B1 | 7/2002 | Ladd et al. |
| 6,458,895 | B1 | 10/2002 | Wrigley et al. |
| 6,465,578 | B1 | 10/2002 | Bissonnette et al. |
| 6,486,294 | B1 | 11/2002 | Brack et al. |
| 6,508,725 | B1 * | 1/2003 | Kim ........................ 473/373 |
| 6,508,968 | B1 | 1/2003 | Bulpett et al. |
| 6,599,966 | B2 | 7/2003 | Penning et al. |
| 6,616,549 | B2 | 9/2003 | Dalton et al. |
| 6,645,088 | B2 | 11/2003 | Wu et al. |
| 6,657,018 | B1 | 12/2003 | Hoover |
| 6,677,401 | B2 | 1/2004 | Boehm et al. |
| 6,812,320 | B2 | 11/2004 | Silva et al. |
| 2001/0009944 | A1 | 7/2001 | Chisholm et al. |
| 2002/0147057 | A1 * | 10/2002 | Binette et al. .............. 473/378 |
| 2002/0187857 | A1 | 12/2002 | Kuntimaddi et al. |
| 2003/0004013 | A1 * | 1/2003 | Lutz et al. .................. 473/374 |
| 2004/0122168 | A1 | 6/2004 | Murray |
| 2004/0138388 | A1 | 7/2004 | Pecorini et al. |

FOREIGN PATENT DOCUMENTS

JP        07331044      * 12/1995

* cited by examiner

Primary Examiner—David J. Buttner
(74) Attorney, Agent, or Firm—William B. Lacy (57) ABSTRACT

The present invention is directed a golf ball that uses impact modified non-ionic engineered thermoplastic polycarbonate/polyester copolymer or blend, for example polycarbonate/poly(butylene terephthalate) (PC/PBT) impact modified by blending with functionalized thermoplastic block co-polymers like maleic anhydride grafted styrene-butadiene-styrene and its hydrogenated derivatives. The impact modified thermoplastic polycarbonate/polyester are used as intermediate layers to produce golf balls having lower flexural modulus and improved durability.

20 Claims, 1 Drawing Sheet

FIG. 1

GOLF BALLS CONTAINING IMPACT MODIFIED NON-IONIC THERMOPLASTIC POLYCARBONATE/POLYESTER COPOLYMERS OR BLENDS

This application is a continuation-in-part of U.S. patent application Ser. No. 10/617,646 filed Jul. 11, 2003, now U.S. Pat. No. 6,926,620 which is a continuation of U.S. patent application Ser. No. 10/008,013, filed Nov. 13, 2001 now U.S. Pat. No. 6,616,549, which is a continuation-in-part of U.S. patent application Ser. No. 09/161,223 filed Sep. 28, 1998, now U.S. Pat. No. 6,315,680 which is a continuation-in-part of U.S. patent application Ser. Nos. 08/996,718 now U.S. Pat. No. 6,124,389, Ser. No. 08/706,008 now U.S. Pat. No. 5,813,923, Ser. No. 08/603,057 now U.S. Pat. No. 5,759,676, Ser. No. 08/606,373 now U.S. Pat. Nos. 5,721,304, and Ser. No. 08/746,362 now U.S. Pat. No. 5,810,678, which were filed Dec. 23, 1997, Aug. 30, 1996, Feb. 16, 1996, Feb. 23, 1996, and Nov. 8, 1996, respectively, which are continuation-in-part applications of U.S. patent application Ser. No. 08/482,522 now U.S. Pat. No. 5,688,191, filed Jun. 7, 1995. The entire disclosures of these applications are incorporated herein by reference.

FIELD OF THE INVENTION

This invention relates generally to golf balls and, in particular, to golf balls having low flexural modulus inner layers made from non-ionic thermoplastic polycarbonate/polyester blend and their copolymers modified with functionalized thermoplastic block copolymers or blends.

BACKGROUND OF THE INVENTION

Conventional golf balls can be divided into solid balls and wound balls. The difference in play characteristics resulting from these different types of constructions can be quite significant.

Solid balls having a two piece construction are generally most popular with the average recreational golfer, because they are durable balls and provide maximum distance. Two piece balls are made with a single solid core, usually made of a cross-linked rubber, which is encased by a cover material. Typically, the solid core is made of polybutadiene which is chemically cross-linked with zinc diacrylate and/or similar cross-linking agents and is covered by a tough, cut-proof blended cover. The cover generally includes a thermoplastic ionomeric polymer such as SURLYN® produced by DuPont. The combination of the core and cover materials provides a hard and durable ball. Other polymers, such as polycarbonate or polybutylene terephthalate or their blends, have a flexural modulus of greater than about 200,000 psi and exhibit poor impact resistance upon hitting in a repeated impact test. Such combinations produce very hard and unacceptable feel for golfers. In addition, the high rigidity these balls have relatively low spin rates, which make them difficult to control, particularly on shorter approach shots.

Hence, a need exists for an improved golf ball having improved durability and a lower flexural modulus.

SUMMARY OF THE INVENTION

A golf ball constructed in accordance with the present invention has at least one core layer, at least one cover layer and at least one intermediate layer disposed between the core and the outer cover. The intermediate layer includes an impact modified non-ionic thermoplastic polycarbonate/polyester copolymer or blend that has a flexural modulus of less than about 100,000 psi and a specific gravity of less than 1.1. Preferably the flexural modulus is less than 80,000 psi and more preferably between 50,000 to 70,000 psi.

In one embodiment, the impact modified non-ionic thermoplastic polycarbonate/polyester copolymer or blend includes, but is not limited to, a polycarbonate/aliphatic polyester or poly(butylene terephthalate) having a melting point of at least 190° C., preferably in the range of 200° C. to 225° C., a crystallization temperature of at least 125° C., preferably in the range of 140° C. to 160° C., and a specific gravity of at least 1.05, preferably 1.06 to 1.11 that is blended with an impact modifying compound. The impact modifying compound is present in an amount from about 10 wt % up to about 70 wt % and preferably in a range of 30 to 60 wt % and includes a functionalized thermoplastic block copolymer. In one embodiment, the functionalized block copolymer or blend includes styrene-butadiene-styrene or their hydrogenated derivative, i.e. styrene-ethylene-butylene-styrene. The thermoplastic block copolymer or blend can be functionalized with either grafted monomers like maleic anhydride or glycidyl methacrylate or glycidyl acrylate in an amount from about 0.5 wt % and about 10 wt % and preferably in a range of about 0.5 wt % to about 5 wt %. The impact modified non-ionic thermoplastic polycarbonate/polyester copolymer or blend surrounds a core that preferably has a coefficient of restitution of at least about 0.8. At least one of the core and intermediate layer can be treated with a surface modifying additive such as an amine terminated silane solution to improved adhesion among the layers of the golf ball.

DESCRIPTION OF THE PREFERRED EMBODIMENTS

Figure 1:
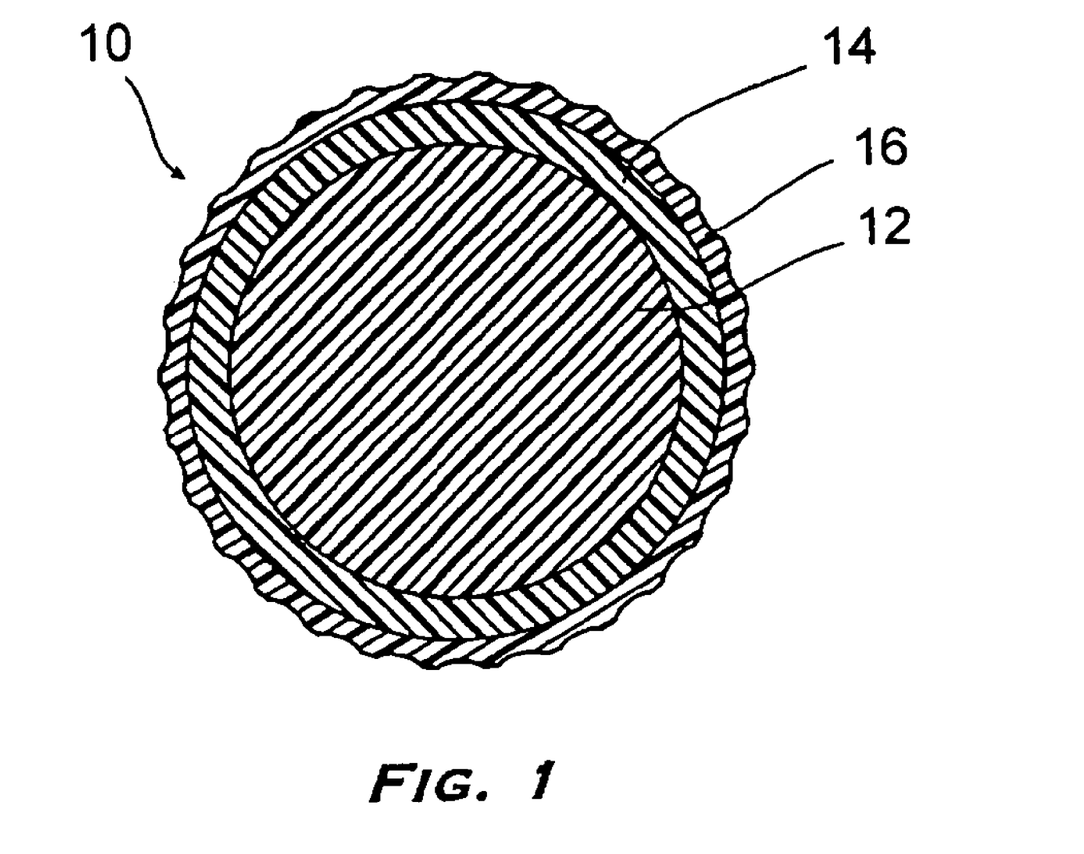
FIG. 1 is a cross-sectional view of a golf ball according to the present invention.

Golf balls constructed in accordance with the present invention include a variety of constructions. As shown in FIG. 1, golf ball 10 includes central core 12, outer cover layer 16 and at least one intermediate layer 14 disposed between central core 12 and outer cover layer 16. Intermediate layer 14 may be an outer core layer, an inner cover layer or a mantle layer. Central core 12 and outer cover layer 16 may be constructed as single layers or can have a plurality of layers. Golf ball 10 can be a wound, two-piece or multi-piece golf ball.

Inner layer 14 is preferably made from impact modified, non-ionic engineered thermoplastic polycarbonate/polyester copolymers or blends. These copolymers or blends are selected to have increased durability, improved impact resistance and relatively lower flexural modulus. In one embodiment, the impact modified thermoplastic polycarbonate/polyester copolymer or blend has a flexural modulus of less than about 100,000 psi. In another embodiment, the impact modified thermoplastic polycarbonate/polyester copolymer or blend has a flexural modulus of less than about 80,000 psi. Preferably, the impact modified thermoplastic polycarbonate/polyester copolymer or blend has a flexural modulus between about 50,000 and about 70,000 psi. Flexural modulus as used herein is measured in accordance with ASTM method D-6272-02, Procedure B, a Test speed 0.5 in/min. Intermediate layer 14 preferably has a thickness of 0.125 to 0.035 inch.

Suitable thermoplastic polycarbonate/polyester copolymers or blends include, but are not limited to, polycarbonate/poly(butylene terephthalate) (PC/PBT). Suitable PC/PBT are commercially available under the trade names Xylex® and Xenoy® from General Electric Corporation of Pittsfield, Mass. or Ultradur® from BASF or Makroblend® from Bayer. Exemplary methods of making aliphatic polyesters or polycarbonate/polyesters are disclosed in U.S. Pat. Nos. 4,467,057, 6,486,294 and 6,812,320, which are incorporated herein by reference in their entireties. The PC/PBT blend may also be modified by blending with, for example, acrylonitrile butadiene styrene (ABS) plastics.

Other suitable polymers that can be used as stand alone or along with the polycarbonate/polyester copolymers and blends in accordance with this invention include, but are not limited to:

(1) The modified polyester compositions described in U.S. Pat. No. 4,467,057. A modified polyester composition can comprise (a) a polyester composition, (b) an impact modifier, and (c) a mineral filler. The polyester composition comprises: (i) a block copolyester of poly(1,4-butylene terephthalate) and an aromatic/aliphatic or aliphatic polyester; (ii) a blend of (i) and a poly(ethylene terephthalate) resin; or (iii) a blend of (i) and a poly(1,4-butylene terephthalate) resin. The impact modifier comprises: (i) a selectively hydrogenated monoalkenyl arene-diene block copolymer resin; and (ii) an aromatic polycarbonate resin in an amount of from at least about 1.0 up to 60 parts per 100 parts by weight of (a) and (b) together. An effective amount of the mineral filler, selected from the group consisting of clay, mica and talc, is used in the composition.

(2) The poly(carbonate-co-ester) copolymers described in U.S. Pat. No. 6,486,294. A poly(carbonate-co-ester) copolymer is a reaction mixture comprising an aromatic dihydroxy compound, a carbonic acid diester, and a catalyst, and a polyester prepolymer with the reaction mixture, wherein the polyester prepolymer comprises the following structure:

wherein the groups $R_1$, $R_2$, and $R_3$ may vary within the same prepolymer and represent an aryl group, an aralkyl group, a branched $C_1$-$C_{40}$ alkyl group, a linear $C_1$-$C_{40}$ alkyl group, a branched $C_1$-$C_{40}$ alkoxy group, or a linear $C_1$-$C_{40}$ alkoxy group. The polyester prepolymer is synthesized from reactants comprising at least one diol and at least one diacid, with each diol possessing the $R_2$ group. The $R_2$ group for each diol is selected from the group consisting of hexanediol, ethylene glycol, propylene glycol, butanediol, pentanediol, neopentyl glycol, heptanediol, octanediol, decanediol, and dodecanediol. The at least one diacid is selected from the group consisting of carbonic acid, oxalic acid, succinic acid, glutaric acid, adipic acid, pimelic acid, sebacic acid, decanedioic acid, dodecanedioic acid, $C_{36}$ acid, isophthalic acid and terephthalic acid.

(3) The block copolyestercarbonates described in U.S. Pat. No. 6,812,320. A block copolyestercarbonate can comprise chain members derived from at least one dihydroxy-substituted aromatic hydrocarbon moiety and at least one aromatic dicarboxylic acid moiety, said polymer being substantially free of anhydride linkages linking at least two mers of the polyester chain segments. The at least one dihydroxy-substituted aromatic hydrocarbon moiety has the structure HO-D-OH, wherein D is a divalent aromatic radical with the structure of formula:

wherein $A^1$ is an aromatic group; E is at least one alkylene, alkylidene, or cycloaliphatic group, a sulfur-containing linkage, a phosphorus-containing linkage, an ether linkage; a carbonyl group, a tertiary nitrogen group, or a silicon-containing linkage; $R^1$ is hydrogen or a monovalent hydrocarbon group; $Y^1$ is independently a monovalent hydrocarbon group, alkenyl, allyl, halogen, bromine, chlorine; nitro; and —OR, wherein R is a monovalent hydrocarbon group; "μm" represents any integer from and including zero through the number of positions on $A^1$ available for substitution; "p" represents an integer from and including zero through the number of positions on E available for substitution; "t" represents an integer equal to at least one; "s" is either zero or one; and "u" represents any integer including zero.

(4) The polycarbonate-polyester compositions described in U.S. Pat. No. 6,599,966. A, polycarbonate-polyester composition can comprise (a) from 10 to 90 weight percent of a polyester resin, (b) from 90 to 10 weight percent of an aromatic polycarbonate, polyarylate, polyester carbonate resin, or blend thereof, and (c) a flow improving amount of a lignin additive and/or a phosphonium sulfonate compound. The lignin additive is selected from the group consisting of lignin, kraft lignin, lignosulfonates, and mixtures thereof. The phosphonium sulfonate compound has the formula wherein $R^1$ is $C_{1-40}$ alkyl or aryl or alkylaryl, and $R^3$-$R^6$ are each H, $C_{1-10}$ alkyl, or aryl. In one embodiment, the phosphonium sulfonate compound is tetrabutylphosphonium dodecylbenzene sulfonate. The polyarylate and polyester carbonate resin can be derived from bis phenol A and a mixture of isophthalic acid and terephthalic acid. The polyester can be selected from the group consisting of poly(ethylene terephthalate) "PET", poly(1,4-butylene terephthalate), "PBT", poly(propylene terephthalate) "PPT", poly(1,4-cyclohexyl-dimethylene terephthalate) "PCT", poly(1,4-cyclohexyl-dimethylene cyclohexyl dicarboxylate) "PCCD", and mixtures thereof. The polyester carbonate to polycarbonate or polyarylate to polycarbonate weight ratio can be 90:10 to 10:90. The polycarbonate-polyester composition can further comprise an impact modifier, which is selected from the group consisting of methacrylate butadiene rubber; acrylic rubber; and polyolefin copolymers containing acrylic, methacrylic, vinyl ester or vinyl ether derived units.

(5) The siloxane polycarbonate block copolymers described in U.S. Pat. No. 5,455,310. A thermoplastic siloxane polycarbonate block copolymer can comprise: (A) about 5 to 50 weight percent of a thermoplastic siloxane polyester-carbonate block-terpolymer and (B) about 95 to about 50 weight percent of a synthetic polymeric resin. The siloxane polyester-carbonate block termpolymer comprises:

(i) a polyester-carbonate copolymer comprising recurring units of the formula:

$R^4$ and $R^5$ are each independently selected from hydrogen, hydrocarbyl and halogen-substituted hydrocarbyl; copolycondensed with 10 to 90 mole % of ester units, relative to the combined total carbonate and ester units of the polyester-carbonate copolymer blocks, of the formula:

wherein $A^1$ is alkylene of about 6 to about 18 carbon atoms or phenylene; and (ii) a repeating or recurring polysiloxane unit of the formula selected from wherein $R^1$ and $R^2$ are each independently selected from hydrogen, hydrocarbyl and halogen-substituted hydrocarbyl; A' is a straight or branched alkylene of 2 to 12 carbon atoms; D is an integer of from about 10 to about 120; Y is selected from hydrogen, hydrocarbyl, hydrocarbyloxy and halogen; E is an integer of from about 1 to about 10 and A and X are as defined above. The weight percentage of said polyestercarbonate copolymer blocks (i) is from about 99 to about 50% of the total weight of the siloxane polyester-carbonate block terpolymer, and the weight percentage of said polysiloxane blocks (ii) is from about 1 to 50% of the total weight percent of the siloxane polyester-carbonate block terpolymer.

The synthetic polymeric resin containing recurring or repeating polycarbonate units of the formula:

wherein Z is —O—, —N($R^3$)— or a mixture thereof. $R^3$ is selected from hydrogen, hydrocarbyl and halogen-substituted hydrocarbyl.

(6) The polycarbonate-polysiloxane block copolymers described in U.S. Pat. Nos. 6,657,018 and 6,072,011. A polysiloxane-polycarbonate block copolymer can comprise: (1) polycarbonate blocks with recurring units of the formula:

where $R^3$ and $R^4$ are each independently selected from hydrogen, hydrocarbyl or halogen-substituted hydrocarbyl; and (2) interrupting polysiloxane blocks of the formula:

-continued where $R^1$ and $R^2$ are each independently selected from hydrogen, hydrocarbyl or halogen-substituted hydrocarbyl; D is an integer of from about 10 to about 120; and Y is selected from hydrogen, hydrocarbyl, hydrocarbyloxy and halogen. Wherein the weight percentage of said polycarbonate blocks (1) is from about 92 to about 96%, and the weight percentage of siloxane from said polysiloxane blocks (2) is from about 4 to 8%.

(7) The thermoplastic terpolymers having aromatic polyester, polysiloxane and polycarbonate described in U.S. Pat. No. 5,932,677. A thermoplastic terpolymer can comprise (a) about 1 to about 50 weight percent of a repeating or recurring polysiloxane unit, based on the total weight of the terpolymer, of the formula:

where $R^1$ and $R^2$ are each independently selected from hydrogen, hydrocarbyl, or halogen-substituted hydrocarbyl; D is an integer of from about 10 to about 120; and Y is hydrogen, alkyl or alkoxy; and (b) about 99 to about 50% by weight of the terpolymer of polycarbonate segments and aromatic polyester segments consisting essentially of from about 80 to about 10% by weight, relative to the total weight of the carbonate and aromatic ester segments in the terpolymer, of polycarbonate units of the formula:

where $R^3$ and $R^4$ are each selected from hydrogen, hydrocarbyl or halogen-substituted hydrocarbyl; and from 20 to 90% by weight, relative to the total weight of the carbonate and aromatic ester segments in the terpolymer, of aromatic diester units of the formula:

where A is phenylene.

(8) The thermoplastic block terpolymers having aliphatic polyester, polysiloxane and polycarbonate described in U.S. Pat. No. 5,608,026. A thermoplastic block terpolymer can comprise (a) about 1 to about 30% by weight of the terpolymer of a siloxane from recurring polysiloxane blocks of the formula:

where $R^1$ and $R^2$ are each independently selected from hydrogen, hydrocarbyl, or halogen-substituted hydrocarbyl; D is an integer of from about 10 to about 120; and Y is hydrogen, alkyl or alkoxy; and (b) about 70 to about 99% by weight of the terpolymer of a polycarbonate-aliphatic polyester condensation copolymer block consisting essentially of from about 80 to about 99% by weight, relative to the total weight of recurring units in (b), of polycarbonate units of the formula:

where $R^3$ and $R^4$ are each selected from hydrogen, hydrocarbyl or halogen-substituted hydrocarbyl; and from 1 to 20% by weight, relative to the total weight of the recurring units in (b), of aliphatic diester units of the formula:

where A is an alkylene moiety, of about 6 to about 18 carbon atoms.

(9) The silicone-polycarbonate block copolymers and polycarbonate blends described in U.S. Pat. No. 5,530,083. A silicone polycarbonate block copolymer can be blended with polycarbonate to produce a polycarbonate blend having a haze value of less than about 30, where the silicone polycarbonate block copolymer has about 0.5% to about 80% by weight of chemically combined polydiorganosiloxane with an average block length of about 10 to about 100 chemically combined diorganosiloxy units.

(10) The silicone-polyester copolymers described in U.S. Pat. No. 4,539,379. A silicone-polyester copolymer can comprise a reaction mixture of aminoalkyl chain-stopped polydiorganosiloxane and a molten thermoplastic polyester to produce a silicone-polyester copolymer having a silicone block and a polyester block joined together by a siloxy organoamide linkage having the formula:

where $R^1$ is selected from $C_{(1-13)}$ monovalent hydrocarbon radicals, substituted $C_{(1-13)}$ monovalent hydrocarbon radicals and $C_{(1-8)}$ alkoxy radicals, $R^2$ is a $C_{(2-13)}$ divalent organo radical and $R^6$ is a $C_{(6-13)}$ divalent aromatic hydrocarbon radical. The amino alkyl terminated polydiorganosiloxane can be an amino alkyl terminated polydimethylsiloxane. The thermoplastic polyester is a polybutyleneterephthalate. The amino alkyl terminated polydiorganosiloxane is a gamma-aminopropyl ethoxy terminated polydiorganosiloxane.

(11) The thermoplastic blends of silicone-polycarbonate block copolymers with a compatibilized alloy of polyphenylene ether resin/polyester resin described in U.S. Pat. No. 4,879,346. A thermoplastic composition can comprise: (a) silicone-polycarbonate block copolymer; (b) compatibilized polyphenylene ether resin and polyester resin blend comprising (i) polyphenylene ether resin; (ii) polyester resin; and (iii) at least one compatibilizer in an amount sufficient to effect or improve compatibility between components (b)(i) and (b)(ii). The silicone-polycarbonate block copolymer is of the formula:

wherein n is an integer equal to from 1 to about 1000; a is equal to from 1 to about 200; and b is from about 1 to 100; the ratio of a to b can vary from about 0.05 to about 3; d is 1 or more; Y is where A is a member selected from the group consisting of hydrogen and where R is a member selected from the group consisting of hydrogen, monovalent hydrocarbon radicals and halogenated monovalent radicals, R' is a member selected from the group consisting of monovalent hydrocarbon radicals and cyanoalkyl radicals, R" is a member selected from the group consisting of monovalent hydrocarbon radicals and halogenated hydrocarbon radicals, and Z is a member selected from the group consisting of hydrogen, lower alkyl radicals and halogen radicals and mixtures thereof.

All the references recited in paragraphs (1) through (11) are incorporated by reference herein in their entireties.

A person skilled in the art can also use a caprolactone (CAPA)-based polyol to produce an aliphatic polyester as well as a linear aliphatic polycarbonate for a golf ball composition. Polycarbonate/polyester copolymers or blends can be derived from the CAPA-based polyols. In addition, alicyclic diols such as cylcohexanediol (CHDI) and cyclohexanedimethanol (CHDM), described in U.S. Pat. App. Pub. 2004/0138388 and incorporated herein by reference in its entirety, can be used to produce an aliphatic polycarbonate/polyester copolymers or blends. These alicyclic diols, i.e. CHDI and CHDM, together with a prepolymer of polyester derived from CAPA-based polyols, can produce polycarbonate/polyester copolymers or blends that can also be used in the present invention.

Additionally, polycarbonate/polyester copolymers or blends can further admix with a polycarbonate, as described in U.S. Pat. No. 5,605,980, which is incorporated herein by reference in its entirety. Such a composition can comprise (i) about 20 to 80 weight percent of a linear aromatic polycarbonate in admixture with a (ii) about 80 to 20 weight percent of a polycarbonate/polyester copolymer having repeating units of the structure wherein R is independently selected from monovalent hydrocarbon and monovalent hydrocarbonoxy radicals; $R^1$ is independently selected from monovalent hydrocarbon and monovalent hydrocarbonoxy radicals; W is selected from divalent hydrocarbon radicals, n and $n^1$ are independently selected from integers having a value of from 0 to 4 inclusive and b is either zero or one; X is an alkylene group of about 6 to 18 carbon atoms, inclusive; and d is from about 2 to 30 mole percent of the total units.

Another polycarbonate/polyester copolymer or blend can be derived from an aromatic polycarbonate resin, a cycloaliphatic copolyester and an electrostatic dissipating polymer for imparting electrostatic dissipative properties as described in U.S. Pat. App. Pub. 2004/0122168, which is incorporated herein by reference in its entirety. Such a copolymer or blend can comprise a transparent aromatic polycarbonate resin, a miscible transparent cycloaliphatic copolyester, and a sufficient amount of an electrostatic dissipating polymer for imparting electrostatic dissipative properties to the composition.

The polycarbonate resins can be produced by the reaction of the carbonate precursor with dihydroxy compounds such as bisphenols that can be represented by:

wherein $R^a$ and $R^b$ each represents a halogen atom, for example chlorine or bromine, or a monovalent hydrocarbon group, preferably having from 1 to 10 carbon atoms, and may be the same or different; p and q are each independently integers from 0 to 4. Preferably, $X^a$ represents one of the groups of formula:

wherein $R^c$ and $R^d$ each independently represents a hydrogen atom or a monovalent linear or cyclic hydrocarbon group and $R^e$ is a divalent hydrocarbon group.

The cycloaliphatic copolyester comprises the reaction product selected from the group consisting of (1) at least 80 weight % of cycloaliphatic diol with the remainder, if any, being a linear aliphatic diol, or a combination of a linear aliphatic diol and a linear aliphatic diacid, or chemical equivalents of the above, (2) at least 80 weight % of a cycloaliphatic dicarboxylic acid with the remainder, if any, being a linear aliphatic diacid, or a combination of a linear aliphatic diacid and a linear aliphatic diol or chemical equivalents of above, and (3) a mixture of at least 80 weight % of a cycloaliphatic diol and at least 80 weight % of a cycloaliphatic dicarboxylic acid with the remainder, if any, being a linear aliphatic diol or a linear aliphatic diol acid or a mixture of the two, or chemical equivalents of the above. The cycloaliphatic diol is prepared from cycloaliphatic alkane diols of 2 to 12 carbon atoms such as 1,4-cyclohexyl primary diol. The cycloaliphatic diacid is prepared from dicarbonylic acids having at least two carboxyl groups each of which is attached to a saturated carbon such as cyclo and biyclo aliphatic acids selected from the group consisting of decahydronaphthalene dicarboxylic acids, norbornene dicarboxylic acids, bicyclo octane dicarboxylic acids, 1,4-cyclohexanedicarboyllic, and chemical equivalents thereof. An example the cycloaliphatic copolyester is poly(1,4-cyclohexane-dimethanol-1,4-dicaroxylate). The electrostatic dissipating polymer is selected from the group consisting of copolyesteramides, polyether-polyamides, polyetheramide block copolymers, polyetherester-amide block copolymers, polyurethane containing a polyalkyalkylene glycol moeity, polyetheresters, and mixtures thereof.

Another polycarbonate/polyester copolymer or blend can be derived from an aromatic polycarbonate homopolymer and a polyester/polycarbonate homopolymer as described in U.S. Statutory Invention Registration H1975, which is incorporated herein by reference in its entirety. The aromatic polycarbonate homopolymer can be based on the bisphenol-A monomer and the like. The polyester/polycarbonate can be prepared by reacting a dicarboxylic acid with the bisphenol-A monomer. Suitable examples of the dicarboxylic acid include, but are not limited to, decanedioic acid, dodecanedioic acid and tetradecanedioic acid.

Additional polycarbonate/polyester copolymer or blend can be derived from brominated polycarbonate and metal sulfonate polyester copolymer as described in U.S. Pat. App. Pub. 2001/0009944, which is incorporated herein by reference in its entirety. The amount of the brominated polycarbonate can be from about 2% wt to about 20% wt of the metal sulfonated polyester copolymer. The brominated polycarbonate can be prepared from starting materials such as tetrabromobisphenol A and related compounds. The metal sulfonate polyester copolymer has the chemical formula:

wherein x and y are in mole percent, x has a range of 0.1 mole % to 50 mole %, R is halogen, alkyl, aryl, alkylaryl or hydrogen, $R^1$ is derived from a diol reactant comprising straight chain, branched, or cycloaliphatic alkane diols and containing from 2 to 12 carbon atoms, $A^1$ is a divalent aryl radical, and M is zinc, tin, alkaline or alkaline earth metals.

Alternatively, polycarbonate/polyester copolymer or blend can also be derived from a brominated polycarbonate and a polyester copolymer. The polyester copolymer, which is similar to the polyester copolymer previously discussed except that the metal sulfonate group is removed, has the chemical formula:

wherein x and y are in mole percent, x has a range of 0.1 mole % to 50 mole %, R is halogen, alkyl, aryl, alkylaryl or hydrogen, $R^1$ is derived from a diol reactant comprising straight chain, branched, or cycloaliphatic alkane diols and containing from 2 to 12 carbon atoms, and $A^1$ is a divalent aryl radical.

A person skilled in the art can also impart impact resistant by copolymerizing a suitable low temperature monomers or oligomers with the polycarbonate/polyester.

In the absence of flow and impact modifiers, the engineered thermoplastic polycarbonate/polyester, for example PC/PBT, can be difficult to injection mold and demonstrates poor knit-line durability. Therefore, the thermoplastic polycarbonate/polyester is blended with a suitable amount of an impact modifying compound, which contributes to the improved impact resistance and lower flexural modulus of golf ball 10. The impact modifying compound can be blended in an amount from about 10% to about 70% by weight, preferably from about 25% to about 60% by weight, more preferably from about 30% to about 50% by weight. Suitable impact modifying compounds include, but are not limited to, functionalized thermoplastic block and random copolymers. In one embodiment, the thermoplastic block copolymer is styrene-butadiene-styrene (SBS). Preferably, the thermoplastic block copolymer is the hydrogenated derivative styrene-ethylene-butylene-styrene (SEBS). Other suitable thermoplastic impact modifying compounds are disclosed in U.S. Pat. No. 5,455,302, which is incorporated herein by reference in its entirety. The elastomeric segment in the block co-polymer contributes to the improved impact resistance of golf ball 10. In addition, a person skilled in the art can use other impact modifying materials such as a copolymer of ethylene-alkyl acrylate or methacrylate, chlorinated polyethylene, a low modulus ionomer and their precursors, as well as highly neutralized ionomers and their precursors.

The thermoplastic block copolymer or blend can be functionalized with impact modifying compounds that provide improved chemical compatibility by reacting with end hydroxyl groups or carboxylic acid in the engineered thermoplastic polycarbonate/polyester compounds. Suitable compounds for functionalization include maleic anhydride and glycidyl methacrylate and hydroxyl groups like hydroxyl terminated block copolymers, available as Septon HG 252 from Kuraray. Preferably, the compound is maleic anhydride. The functionalizing compound is present in an amount of up to about 5% by weight, preferably between about 1% and about 3% by weight, more preferably about 2% by weight. A suitable functionalized hydrogenated thermoplastic block copolymer is maleic anhydride functionalized SEBS commercially available under the trademark Kraton™ FG-1901X or FG-1921X from Kraton Polymers of Houston, Tex. The thermoplastic block co-polymer or blend impact modifying compounds can be functionalized using methods known and available in the art. Suitable methods and catalysts for functionalizing the block copolymer are disclosed in U.S. Pat. No. 6,150,462, which is incorporated herein by reference in its entirety.

Central core 12 can be a hollow core, liquid-filled core, wound core or a solid core. In one embodiment, central core 12 is a liquid-filled or solid core around which an elastic thread is wound. The liquid-filled center is typically a thin walled sphere into which a liquid is injected by means of a hypodermic needle. The sphere is then sealed and frozen to make the center a solid mass. The windings for either type of center are provided by an elastic thread that is stretched and wound about the center to a desired thickness. Preferably, central core 12 is a solid core.

Central core 12 has a diameter from about 0.5 inches to about 1.62 inches, preferably between about 1.30 inches and about 1.57 inches, more preferably about 1.50 inches to about 1.58 inches, most preferably about 1.55 inches. The overall diameter of central core 12 and inner layer 14 is about 84% to about 97% of the overall diameter of the golf ball 10. In addition, central core 12 has a weight of about 1.3 ounces, a compression less than about 75, preferably from about 68 to about 73, a specific gravity of about 1.13 to about 1.15 and a Shore C hardness of about 80. Central core 12 is constructed to have a coefficient of restitution ("COR") greater than about 0.800, for example from about 0.810 to about 0.830, preferably from about 0.825 to about 0.830, more preferably about 0.827. In one embodiment of the present invention, solid cores having a diameter of about 1.550 inches, a compression of about 72, a COR of about 0.809 at 125 ft/sec are used. However, cores with lower compression but higher resiliency can be achieved by incorporating organosulfur compounds in the core formulations.

Central core 12 may contain a variety of materials, including compositions having a base rubber, a cross-linking agent, a filler, a halogenated organosulfur compound, and a co-cross-linking or initiator agent. The base rubber typically includes natural or synthetic rubbers. A preferred base rubber is 1,4-polybutadiene having a cis-structure of at least 40%, more preferably at least about 90%, and most preferably at least about 95%. In another embodiment, the base rubber includes a high-Mooney-viscosity rubber. Preferably, the base rubber has a Mooney viscosity greater than about 35, more preferably greater than about 50. In another embodiment, the polybutadiene rubber has a molecular weight greater than about 300,000 and a polydispersity of no greater than about 2. Examples of suitable polybutadiene rubbers include BUNA® CB22 and BUNA® CB23 commercially available from Bayer of Akron, Ohio, UBEPOL® 360L and UBEPOL® 150L commercially available from UBE Industries of Tokyo, Japan, and CARIFLEX® BCP820 and CARIFLEX® BCP824, CARIFLEX® 1220 commercially available from Shell of Houston, Tex. If desired, the polybutadiene can also be mixed with other elastomers known in the art such as natural rubber, polyisoprene rubber and/or styrene-butadiene rubber, EPDM and EPR in order to modify the properties of the core.

The cross-linking agent includes a metal salt, such as a zinc salt or a magnesium unsaturated fatty acid, such as acrylic or methacrylic acid, having 3 to 8 carbon atoms. Examples include, but are not limited to, one or more metal salt diacrylates, dimethacrylates, and monomethacrylates, wherein the metal is magnesium, calcium, zinc, aluminum, sodium, lithium, or nickel. Preferred acrylates include zinc acrylate, zinc diacrylate, zinc methacrylate, zinc dimethacrylate, and mixtures thereof. The cross-linking agent is typically present in an amount greater than about 10 parts per hundred ("pph") of the base polymer, preferably from about 20 to 40 pph of the base polymer, more preferably from about 25 to 35 pph of the base polymer.

The initiator agent can be any known polymerization initiator that decomposes during the cure cycle. Suitable initiators include organic peroxide as well as azo compounds, such as dicumyl peroxide, 1,1-di(t-butylperoxy) 3,3,5-trimethyl cyclohexane, α,α-bis (t-butylperoxy) diisopropylbenzene, 2,5-dimethyl-2,5 di(t-butylperoxy) hexane, di-t-butyl peroxide, and mixtures thereof. Other examples include, but are not limited to, VAROX® 231 XL and Varox® DCP-R, commercially available from Elf Atochem of Philadelphia, Pa., PERKODOX® BC and PERKODOX® 14, commercially available from Akzo Nobel of Chicago, Ill., and ELASTOCHEM® DCP-70, commercially available from Rhein Chemie of Trenton, N.J.

It is well known that peroxides are available in a variety of forms having different activity. The activity is typically defined by the "active oxygen content." For example, PERKODOX® BC peroxide is 98% active and has an active oxygen content of 5.80%, whereas PERKODOX® DCP-70 is 70% active and has an active oxygen content of 4.18%. If the peroxide is present in pure form, it is preferably present in an amount of at least about 0.25 pph, more preferably between about 0.35 pph and about 2.5 pph, and most preferably between about 0.5 pph and about 2 pph. Peroxides are also available in concentrate form, which are well-known to have differing activities, as described above. In this case, if concentrate peroxides are employed in the present invention, one of ordinary skill in the art would know that the concentrations suitable for pure peroxides are easily adjusted for concentrate peroxides by dividing by the activity. For example, 2 pph of a pure peroxide is equivalent to 4 pph of a concentrate peroxide that is 50% active (i.e., 2 divided by 0.5=4).

The organosulfur compounds, as described in U.S. Pat. Nos. 6,508,968, 6,465,578, 6,458,895, 6,417,278, 6,291,592, and 6,162,135, which are hereby incorporated by reference in their entireties, and halogenated organosulfur compounds of the present invention include, but are not limited to, those having the following general formula:

where $R_1$ to $R_5$ can be $C_1$-$C_8$ alkyl groups; halogen groups; thiol groups (—SH), carboxylated groups; sulfonated groups; and hydrogen; in any order; and also pentafluorothiophenol; 2-fluorothiophenol; 3-fluorothiophenol; 4-fluorothiophenol; 2,3-fluorothiophenol; 2,4-fluorothiophenol; 3,4-fluorothiophenol; 3,5-fluorothiophenol 2,3,4-fluorothiophenol; 3,4,5-fluorothiophenol; 2,3,4,5-tetrafluorothiophenol; 2,3,5,6-tetrafluorothiophenol; 4-chlorotetrafluorothiophenol; pentachlorothiophenol; 2-chlorothiophenol; 3-chlorothiophenol; 4-chlorothiophenol; 2,3-chlorothiophenol; 2,4-chlorothiophenol; 3,4-chlorothiophenol; 3,5-chlorothiophenol; 2,3,4-chlorothiophenol; 3,4,5-chlorothiophenol; 2,3,4,5-tetrachlorothiophenol; 2,3,5,6-tetrachlorothiophenol; pentabromothiophenol; 2-bromothiophenol; 3-bromothiophenol; 4-bromothiophenol; 2,3-bromothiophenol; 2,4-bromothiophenol; 3,4-bromothiophenol; 3,5-bromothiophenol; 2,3,4-bromothiophenol; 3,4,5-bromothiophenol; 2,3,4,5-tetrabromothiophenol; 2,3,5,6-tetrabromothiophenol; pentaiodothiophenol; 2-iodothiophenol; 3-iodothiophenol; 4-iodothiophenol; 2,3-iodothiophenol; 2,4-iodothiophenol; 3,4-iodothiophenol; 3,5-iodothiophenol; 2,3,4-iodothiophenol; 3,4,5-iodothiophenol; 2,3,4,5-tetraiodothiophenol; 2,3,5,6-tetraiodothiophenoland; and their zinc salts. Preferably, the halogenated organosulfur compound is pentachlorothiophenol, which is commercially available in neat form or under the tradename STRUKTOL®, a clay-based carrier containing the sulfur compound pentachlorothiophenol loaded at 45 percent (correlating to 2.4 parts PCTP). STRUKTOL® is commercially available from Struktol Company of America of Stow, Ohio. PCTP is commercially available in neat form from eChinachem of San Francisco, Calif. and in the salt form from eChinachem of San Francisco, Calif. Most preferably, the halogenated organosulfur compound is the zinc salt of pentachlorothiophenol, which is commercially available from eChinachem of San Francisco, Calif. The halogenated organosulfur compounds of the present invention are preferably present in an amount greater than about 2.2 pph, more preferably between about 2.3 pph and about 5 pph, and most preferably between about 2.3 and about 4 pph.

Fillers typically include materials such as tungsten, zinc oxide, barium sulfate, silica, calcium carbonate, zinc carbonate, metals, metal oxides and salts, regrind (recycled core material typically ground to about 30 mesh particle), high-Mooney-viscosity rubber regrind, and the like. Fillers added to one or more portions of the golf ball typically include processing aids or compounds to affect rheological and mixing properties, density-modifying fillers, tear strength, or reinforcement fillers, and the like. The fillers are generally inorganic, and suitable fillers include numerous metals or metal oxides, such as zinc oxide and tin oxide, as well as barium sulfate, zinc sulfate, calcium carbonate, barium carbonate, clay, tungsten, tungsten carbide, an array of silicas, and mixtures thereof. Fillers may also include various foaming agents or blowing agents that may be readily selected by one of ordinary skill in the art. Fillers can include polymeric, ceramic, metal, and glass microspheres and can be solid or hollow, and filled or unfilled. Fillers are typically also added to one or more portions of the golf ball to modify the density thereof to conform to uniform golf ball standards. Fillers may also be used to modify the weight of the center or at least one additional layer for specialty balls, e.g., a lower weight ball is preferred for a player having a low swing speed.

The materials used in forming either the golf ball central core 12 or intermediate layer(s) 14, in accordance with the present invention, may be combined to form a mixture by any type of mixing known to one of ordinary skill in the art. Suitable types of mixing include single pass and multi-pass mixing. Suitable mixing equipment is well known to those of ordinary skill in the art, and such equipment may include a Banbury mixer, a two-roll mill, or a twin screw extruder.

Conventional mixing speeds for combining polymers are typically used. The mixing temperature depends upon the type of polymer components, and more importantly, on the type of free-radical initiator. Suitable mixing speeds and temperatures are well-known to those of ordinary skill in the art, or may be readily determined without undue experimentation.

The mixture can be subjected to, e.g., a compression or injection molding process, to obtain solid spheres for the central core 12 or hemispherical shells for forming inner layers 14. The temperature and duration of the molding cycle are selected based upon reactivity of the mixture. The molding cycle may consist of a single step of molding the mixture at a single temperature for a fixed time duration. The molding cycle may also include a two-step process, in which the polymer mixture is held in the mold at an initial temperature for an initial duration of time, followed by holding at a second, typically higher temperature for a second duration of time. In a preferred embodiment of the current invention, a single-step cure cycle is employed. The materials used in forming either the golf ball center or any portion of the core, in accordance with the invention, may be combined to form a golf ball by an injection molding process, which is also well-known to one of ordinary skill in the art. Although the curing time depends on the various materials selected, those of ordinary skill in the art will be readily able to adjust the curing time upward or downward based on the particular materials used and the discussion herein.

In order to provide good adhesion among the various layers of golf ball 10, at least one or more of central core 12 and inner layers 14 can be treated with a functionalized silane, for example an amine terminated silane solution. Suitable methods for treating the various layers of golf ball 10 with these compounds include application techniques such as spraying, dipping, spin coating or flow coating methods that are well known in the art. An example of suitable coating techniques are disclosed in U.S. Pat. Nos. 6,677,401 and 5,733,428. Similarly, U.S. Pat. No. 5,006,297 discloses suitable coating techniques which may be utilized. The entire disclosures of these applications are incorporated herein by reference. In the present embodiment, Silquest A1120 which is based on N-2-(amino ethyl)-3-aminopropyltrimethoxy silane, was used to improve the adhesion between the core and a casing and a cover layer. Additional examples of amine silane modifying agents include, but are not limited to, 4-amino-3,3-dimethylbutyltrimethoxysilane, 3-aminopropyltriethoxysilane, 2-(3,4-epoxycyclohexyl)-ethyltrimethoxysilane, 3-glycidoxypropyltrimethoxysilane, octyltriethoxysilane and the like. See www.specialchem4polymers.com.

Outer cover 16 has a thickness less than about 0.1 inches, for example from about 0.01 inches to about 0.1 inches. In one embodiment, outer cover layer 16 has a thickness of about 0.03 inches to about 0.09 inches. In another embodiment, outer cover layer 16 has a thickness of between about 0.005 inches and about 0.035 inches.

Suitable materials for outer cover layer 16 include thermoplastic and thermosetting materials. In one embodiment of the present invention, the thermoplastic or thermosetting materials of outer cover layer 16 have a melting point or heat of reaction (cure) temperature less than the melting point or heat of reaction (cure) temperature of the materials of the inner layer 14 or central core 12.

Among the preferred conventional cover materials are ionomer resins obtained by providing a cross metallic bond to polymers of monoolefin with at least one member selected from the group consisting of unsaturated mono- or di-carboxylic acids having 3 to 12 carbon atoms and esters thereof (the polymer contains 1 to 50% by weight of the unsaturated mono- or di-carboxylic acid and/or ester thereof). More particularly, such acid-containing ethylene copolymer ionomer component of the subject invention includes E/X/Y copolymers where E is ethylene, X is a softening comonomer such as acrylate or methacrylate present in 0-50 (preferably 0-25, most preferably 0-2), weight percent of the polymer, and Y is acrylic or methacrylic acid present in 5-35 (preferably 8-35, most preferably 8-30) weight percent of the polymer, wherein the acid moiety is neutralized 1-100% (preferably at least 40%, most preferably at least about 80%) to form an ionomer by a cation such as lithium, sodium, potassium, magnesium, calcium, barium, lead, tin, zinc or aluminum, or a combination of such cations. Specific acid-containing ethylene copolymers include ethylene/acrylic acid, ethylene/methacrylic acid, ethylene/acrylic acid/n-butyl acrylate, ethylene/methacrylic acid/n-butyl acrylate, ethylene/methacrylic acid/iso-butyl acrylate, ethylene/acrylic acid/iso-butyl acrylate, ethylene/methacrylic acid/n-butyl methacrylate, ethylene/acrylic acid/methyl methacrylate, ethylene/acrylic acid/methyl acrylate, ethylene/methacrylic acid/methyl acrylate, ethylene/methacrylic acid/methyl methacrylate, and ethylene/acrylic acid/n-butyl methacrylate. Preferred acid-containing ethylene copolymers include ethylene/methacrylic acid, ethylene/acrylic acid, ethylene/methacrylic acid/n-butyl acrylate, ethylene/acrylic acid/n-butyl acrylate, ethylene/methacrylic acid/methyl acrylate and ethylene/acrylic acid/methyl acrylate copolymers. The most preferred acid-containing ethylene copolymers are ethylene/methacrylic acid, ethylene/acrylic acid, ethylene/(meth) acrylic acid/n-butyl acrylate, ethylene/(meth)acrylic acid/ethyl acrylate, and ethylene/(meth) acrylic acid/methyl acrylate copolymers. The manner in which the ionomers are made is well known in the art as described in e.g. U.S. Pat. No. 3,262,272. Such ionomer resins are commercially available from DuPont Co. under the tradename SURLYN® and HPF®, which is an example of a highly neutralized polymer ("HNP"). Additional examples of HNP are described in commonly-owned U.S. patent application Ser. No. 10/882,130, which is incorporated herein by reference in its entirety. Likewise, other conventional materials such as balata, elastomer and polyethylene may also be used in the cover layers of the present invention. Additionally, foamed polymeric materials are suitable for use in the cover layers of the present invention. In particular, metallocene-based foam resins are useful in the cover layers of the present invention.

Additional suitable materials for use in outer cover layer 16 include polyether or polyester thermoplastic urethanes, thermoset polyurethanes, light stable polyurethanes, polyureas, and interpenetrating polymer networks ("IPN"). Examples of suitable interpenetrating polymer networks can be found in U.S. Pat. No. 6,645,088 titled "Reaction Injection Moldable Compositions, Methods For Making Same, And Resultant Golf Articles" and U.S. Pat. App. Pub. 20020187857 titled "Golf Balls Containing Interpenetrating Polymer Networks." The entire disclosures of these two references are incorporated herein by reference. A preferable thermoplastic material is a thermoplastic urethane with a melting point of about 150° C. to about 205° C. A preferable thermoset material is a elastomer based, castable urethane. Suitable materials for the outer layer include polyurethanes, ionomers with a low modulus and other durable materials such as EPDM and butyl rubber. If the outer cover layer includes polyurethane, it includes a prepolymer formed of a polyisocyanate and a polyol, and a curing agent. Preferably, at least one of the prepolymer and curing agent are saturated. In an alternative embodiment, the polyurethane composition comprises at least one of a UV absorber, a hindered amine light stabilizer, or an optical brightener. Additionally, the present invention also contemplates the use of a polymeric foam material, such as a metallocene-based foamed resin. Polyurea is another suitable cover material.

In addition to the conventional outer cover materials, the present invention also contemplates the use of a variety of non-conventional cover materials. In particular, the covers of the present invention may comprise thermoplastic or engineering plastics such as ethylene or propylene based homopolymers and copolymers including functional monomers such as acrylic and methacrylic acid and fully or partially neutralized ionomers and their blends, methyl acrylate, methyl methacrylate homopolymers and copolymers, imidized, amino group containing polymers, polycarbonate, reinforced polyamides, polyphenylene oxide, high impact polystyrene, polyether ketone, polysulfone, poly (phenylene sulfide), reinforced engineering plastics, acrylonitrile-butadiene, acrylic-styrene-acrylonitrile, poly(ethylene terephthalate), poly(butylene terephthalate), poly(ethylene-vinyl alcohol), poly(tetrafluoroethylene) and their copolymers including functional comonomers and blends thereof. These polymers or copolymers can be further reinforced by blending with a wide range of fillers and glass fibers or spheres or wood pulp.

The outer cover layer 16 can be molded about the central core 12 and inner layer 14 using a variety of conventional molding methods. For example, the outer cover layer 16 can be compression molded, retractable pin injection molded, fixed pin injection molded, reaction-injection molded, cast around the central core 12 and inner layer 14. However, it is important that the materials of outer cover layer 16 are characterized in that they have thermal properties such that no flow of the inner layer or mantle layer material occurs during the molding of outer cover layer 16 regardless of the process employed to mold the other layers.

EXAMPLES

A number of test formulations for inner layer were hand mixed for testing. Table 1 lists the physical properties of the core formulation of Samples 1-3. Table 2 lists the ingredients and physical properties of the impact modified polycarbonate/polyester layers of Samples 1-3. The following formulations are given to illustrate the novel multi-layer golf balls of the present invention. However, it is to be understood that the examples are only for illustrative purposes and in no manner is the present invention limited to the specific disclosures therein.

TABLE 1

Physical Properties of Core Formulation

| | |
|---|---|
| Weight (oz) ± std | 1.298 ± 0.002 |
| Compression ± std | 72 ± 0.9 |
| Coefficient of Restitution ± std | 0.809 ± 0.001 |
| Specific Gravity | 1.151 |
| Hardness Shore C ± std | 80 ± 0.4 |

TABLE 2

| | Physical Properties of Intermediate Layer | | |
|---|---|---|---|
| | Sample 1 | Sample 2 | Sample 3 |
| Polycarbonate/Polyester | 75 | 50 | 40 |
| Kraton ™ FG 1901X | 25 | 50 | 60 |
| Compression | 74 | 70 | 68 |
| COR @ 125 ft/s ± Std | 0.794 ± 0.001 | 0.793 ± 0.001 | 0.795 ± 0.001 |
| Shore D Hardness | 56 | 51 | 47 |
| Flexural Modulus (40 hrs) kpsi | 89.4 | 64.1 | 56.5 |
| Flex Hardness (Shore D) (40 hrs) | 56 | 48 | 46 |

Kraton™ FG-1901X is a suitable impact modifying compound, which is a maleic anhydride functionalized SEBS commercially available from Kraton Polymers of Houston, Tex.

After mixing, the three samples were molded around a core formulation having the properties illustrated in Table 1.

Samples 1 to 3 produce suitable physical characteristics in terms of stiffness, flow, moldability and durability. Samples 1 to 3 are also tested for flexural modulus and material hardness, i.e. Shore D, and the test results are given in Table 2. As shown, samples 1 to 3 provide a flexural modulus between 50,000 psi and 90,000 psi, which provides for improved moldability, flow and durability.

Other than in the operating examples, or unless otherwise expressly specified, all of the numerical ranges, amounts, values and percentages such as those for amounts of materials, and others in the specification may be read as if prefaced by the word "about" even though the term "about" may not expressly appear with the value, amount or range. Accordingly, unless indicated to the contrary, the numerical parameters set forth in the specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contain certain errors necessarily resulting from the standard deviation found in their respective testing measurements. Furthermore, when numerical ranges of varying scope are set forth herein, it is contemplated that any combination of these values inclusive of the recited values may be used.

While it is apparent that the illustrative embodiments of the invention disclosed herein fulfill the preferred embodiments of the present invention, it is appreciated that numerous modifications and other embodiments may be devised by those skilled in the art. Examples of such modifications include slight variations of the numerical values discussed above. Hence, the numerical values stated above and claimed below specifically include those values and the values that are approximately or nearly close to the stated and claimed values. Therefore, it will be understood that the appended claims are intended to cover all such modifications and embodiments, which would come within the spirit and scope of the present invention.

What is claimed is:

1. A golf ball comprising:
   a central core having at least one core layer;
   an outer cover layer having at least one cover layer; and
   an intermediate layer disposed between the central core and the outer cover layer;
   wherein the intermediate layer has a flexural modulus of less than 100,000 psi and comprises an impact modified non-ionic thermoplastic polycarbonate/polyester copolymer or blend comprising an aliphatic component selected from the group consisting of a block copolyester of poly(1,4-butylene terephthalate) and an aliphatic polyester, a blend of copolyester of poly(1,4-butylene terephthalate) and an aliphatic polyester and a poly(ethylene terephthalate) resin, block terpolymers derived from aliphatic polyester, polysiloxane and polycarbonate, a polycarbonate/polyester copolymer derived from caprolactone-based polyols, a blend of polycarbonate/polyester derived from caprolactone-based polyols, a polycarbonate/polyester copolymer derived from cyclohexanediol and cyclohexanedimethanol, a blend of polycarbonate/polyester derived from cyclohexanediol and cyclohexanedimethanol a polycarbonate/polyester copolymer derived from caprolactone-based polyols, cyclohexanediol and cyclohexanedimethanol, and a blend of polycarbonate/polyester derived from caprolactone-based polyols, cyclohexanediol and cyclohexanedimethanol.

2. The golf ball of claim 1, wherein the intermediate layer has a flexural modulus of 80,000 psi or less.

3. The golf ball of claim 2, wherein the intermediate layer has a flexural modulus of 50,000 psi to 70,000 psi.

4. The golf ball of claim 1, wherein the intermediate layer has a thickness of 0.125 to 0.035 inch.

5. The golf ball of claim 1, wherein the intermediate layer has a specific gravity of 1.100 or less.

6. The golf ball of claim 1, wherein the non-ionic thermoplastic polycarbonate/polyester copolymer or blend comprises an aromatic component.

7. The golf ball of claim 6, wherein the aromatic component is a member selected from the group consisting of a polycarbonate/poly(butylene terephthalate), a block copolyester of poly(1,4-butylene terephthalate) and an aromatic polyester, a blend of copolyester of poly(1,4-butylene terephthalate) and an aromatic polyester and a poly(ethylene terephthalate) resin, a block poly(carbonate-co-ester) copolymer derived from an aromatic dihydroxy compound and a carbonic acid diester, a block copolyestercarbonate derived from at least one dihydroxy-substituted aromatic hydrocarbon moiety and at least one aromatic dicarboxylic acid moiety, a blend of polycarbonate-polyester derived from a polyester resin, an aromatic polycarbonate and a phosphonium sulfonate, a block terpolymer derived from aromatic polyester, polysiloxane and polycarbonate, a blend of a linear aromatic polycarbonate with a polycarbonate/polyester copolymer, a blend of aromatic polycarbonate homopolymer derived from bisphenol A with a polyester/polycarbonate copolymer derived from a dicarboxylic acid and bisphenol A, a blend of brominated polycarbonate and a metal sulfonate polyester copolymer, and a blend of brominated polycarbonate and a polyester copolymer.

8. The golf ball of claim 1, wherein the impact modified thermoplastic polycarbonate/polyester copolymer or blend further comprises an impact modifying compound, wherein the impact modifying compound is present in an amount from 10 wt % to 70 wt %.

9. The golf ball of claim 8, wherein the impact modifying compound is present in an amount from 30 wt % to 50 wt %.

10. The golf ball of claim 8, wherein the impact modifying compound comprises a functionalized thermoplastic block copolymer.

11. The golf ball of claim 10, wherein the functionalized thermoplastic block copolymer comprises styrene-butadiene-styrene.

12. The golf ball of claim 11, wherein the functionalized thermoplastic block copolymer further comprises maleic anhydride or glycidyl methacrylate.

13. The golf ball of claim 12, wherein the maleic anhydride or glycidyl methacrylate is present from 1% to 5% by weight.

14. The golf ball of claim 13, wherein the maleic anhydride or glycidyl methacrylate is present at 2% by weight.

15. The golf ball of claim 1, wherein the central core has a coefficient of restitution of 0.81 to 0.83.

16. The golf ball of claim 15, wherein the central core has a coefficient of restitution of 0.825 to 0.83.

17. The golf ball of claim 1, wherein the at least one core layer and the intermediate layer are treated with an amine terminated silane solution.

18. The golf ball of claim 17, wherein the amine terminated silane solution comprises a member selected from the group consisting of N-2-(aminoethyl)-3-aminoproplyltrimethoxy silane, 4-amino-3,3-dimethylbutyltrimethoxysilane, 3-aminopropyltriethoxysilane, 2-(3,4-epoxycyclohexyl)-ethyltrimethoxysilane, 3-glycidoxypropyltrimethoxysilane, octyltriethoxysilane, and a combination thereof.

19. A golf ball comprising:
a central core having at least one core layer;
an outer cover layer having at least one cover layer; and
an intermediate layer disposed between the central core and the outer cover layer;
wherein the intermediate layer has a flexural modulus of less than 100,000 psi and comprises an impact modified non-ionic thermoplastic polycarbonate/polyester copolymer or blend comprising a siloxane component selected from the group consisting of a block terpolymer of siloxane polyester-carbonate, a block polysiloxane-polycarbonate copolymer, a block terpolymer derived from aromatic polyester, polysiloxane and polycarbonate, a block terpolymers derived from aliphatic polyester, polysiloxane and polycarbonate, a blend of a silicone polycarbonate block copolymer with a polycarbonate, a blend of silicone-polyester copolymer having a silicone block and a polyester block, and a blend of silicone-polycarbonate block copolymer and polyphenylene ether resin and polyester resin.

20. A golf ball comprising:
a central core having at least one core layer;
an outer cover layer having at least one cover layer; and
an intermediate layer disposed between the central core and the outer cover layer;
wherein the intermediate layer comprises an impact modified non-ionic thermoplastic polycarbonate/polyester copolymer or blend, and has a flexural modulus of less than 100,000 psi;
and wherein the impact modified thermoplastic polycarbonate/polyester copolymer or blend further comprises an impact modifying compound present in an amount from 30 wt % to 50 wt % and comprising a functionalized thermoplastic block copolymer comprising styrene-butadiene-styrene functionalized with, maleic anhydride, or glycidyl methacrylate.

* * * * *